United States Patent [19]
Wert

[11] Patent Number: 5,260,861
[45] Date of Patent: Nov. 9, 1993

[54] DIGITAL CONTROLLED CONVERTER AND METHOD

[76] Inventor: Harry E. Wert, 1210 Glenmore Dr., Apopka, Fla. 32712

[21] Appl. No.: 877,650

[22] Filed: May 1, 1992

[51] Int. Cl.$^5$ ............................................. H02M 3/337
[52] U.S. Cl. ................................... 363/25; 363/56
[58] Field of Search ............. 363/25, 26, 41, 42, 363/56, 79, 80, 197

[56] References Cited

U.S. PATENT DOCUMENTS

| | | | |
|---|---|---|---|
| 4,330,816 | 5/1982 | Imazeki et al. | 363/56 |
| 4,524,412 | 6/1985 | Eng | 363/56 |
| 4,553,198 | 11/1985 | Chan et al. | 363/56 |
| 4,847,544 | 7/1989 | Goldberg | 318/696 |
| 4,885,674 | 12/1989 | Varga et al. | 363/21 |

*Primary Examiner*—William H. Beha, Jr.

[57] ABSTRACT

A digital controlled converter (100) for converting an input signal to a direct current signal having a clock generator (104) for generating a high frequency clock timing signal and a driver circuit (106) for controlling the passage of the high frequency clock timing signal within the converter (100). A power output stage (102) which provides an output signal is controlled by the driver circuit (106). A control loop (108) is provided for sensing and converting the output signal to a command signal. A latch (128) is utilized for latching the command signal and for controlling the state of the driver circuit (106). The latch (128) is reset at the rate of the high frequency clock timing signal and updated with the command signal to provide incremental correction to the output signal. The converter (100) comprises a transient response to variations in load proportional to the high frequency clock timing signal. In a preferred embodiment, the driver circuit (106) functions as a switch for controlling the power output stage (102). The control loop (108) serves to provide the command signal to operate the latch (128). A comparator (138) in the control loop compares the d.c. output signal with an analog reference signal to generate the command signal. In an alternative embodiment, the d.c. output signal is converted to a digital signal and compared to a reference digital word in a digital comparator (292) to provide the command signal.

20 Claims, 7 Drawing Sheets

DIGITAL CONTROLLED CONVERTER AND METHOD

BACKGROUND OF THE INVENTION

1. Field of the Invention

The present invention relates to converters. More specifically, the present invention relates to methods and apparatus for high speed digitally controlled converters for converting an input voltage to a direct current (d.c.) output voltage.

2. Background

Converters are incorporated into power supplies and are employed to transform an input voltage to a d.c. output voltage. Although advances have been made in miniaturizing electronic circuitry, power supplies have remained comparatively large.

The power density (e.g., power per unit volume) of a power supply, and thus a converter, is measured in watts per cubic inch (watts/in$^3$). The power density of a typical converter of the prior art is approximately one watt/in$^3$. In order for converters to adequately provide sufficient power to modern circuit designs, converter power density (e.g., capacity) must be increased while the physical size is simultaneously decreased. For example, a power density of (10 to 40) watts/in$^3$ accompanied by a proportional reduction in volume is necessary to satisfy the requirements of current circuit designs.

Attempts have been made in the art to satisfy these requirements. Initial converter design employed a linear approach. However, the linear converter design exhibited the familiar problems of insufficient power density and excessive volume. Thereafter, the switching converter was developed. The function of the switching converter is to provide higher switching rates to increase power density and reduce converter volume.

The higher switching rate is accomplished by chopping the input voltage at a high electronic rate to provide higher frequency operation and increased power throughput. Early designs of switching converters achieved switching rates of (5–10) KHz/sec. Further, switching converters permit utilization of smaller magnetic components to reduce converter volume and also accept alternating or direct input voltages. Unfortunately, prior art switching converters having switching rates of (50–100) KHz/sec and smaller physical volumes continue to be inadequate for the power density and volume requirements of modern circuit designs.

Note that a converter having a switching rate greater than those mentioned above is not a solution to the power density and volume problems. Upon reaching a threshold frequency or switching rate, the converter tends to becomes unstable. The instability is usually caused by variations in the electrical load or inadequate phase margin and results in instability in the output voltage level. Unfortunately, control loops associated with converters known in the art have only been marginally successful in stabilizing the output voltage, particularly under no load conditions. Therefore, power supply converter design in the art continues to suffer from insufficient switching rates which results in inadequate power density, instability in the output voltage level and oversized packaging.

Thus, a need remains in the art for an improvement in conventional converter design for providing higher power density, improved stability and smaller packaging.

SUMMARY OF THE INVENTION

It is the objective of this invention to provide a digital controlled converter having a very high switching rate, unconditional stability and reduced volume and weight.

The digital controlled converter of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include a control loop transient response proportional to the clock generator frequency, absolute stability down to zero load and smaller packaging for reduced size and weight.

The need in the art is addressed by the digital controlled converter and method of the present invention. The invention includes a clock generator for generating a high frequency clock timing signal and a driver circuit for controlling the passage of the high frequency clock timing signal within the converter. A power output stage which provides an output signal is controlled by the driver circuit. A control loop is provided for sensing and converting the output signal to a command signal. A latch is utilized for latching the command signal and for controlling the state of the driver circuit. The latch is reset at the rate of said high frequency clock timing signal and updated with the command signal to provide incremental correction to the output signal. The converter comprises a transient response to variations in load proportional to the high frequency clock timing signal.

In a preferred embodiment, the driver circuit functions as a switch for controlling the power output stage. The control loop serves to provide the command signal to operate the latch. A comparator in the control loop compares the d.c. output signal with an analog reference signal to generate the command signal. In an alternative embodiment, the d.c. output signal is converted to a digital signal and compared to a reference digital word in a digital comparator to provide the command signal.

BRIEF DESCRIPTION OF THE DRAWINGS

The preferred embodiment of this invention, illustrating all its features, will now be discussed in detail. This embodiment depicts the novel and non-obvious digital controlled converter of this invention shown in the accompanying drawing, which is for illustrative purposes only. This drawing includes the following figures (FIGS.), with like numerals indicating like parts.

DESCRIPTION OF THE PREFERRED EMBODIMENT

Figure 1:
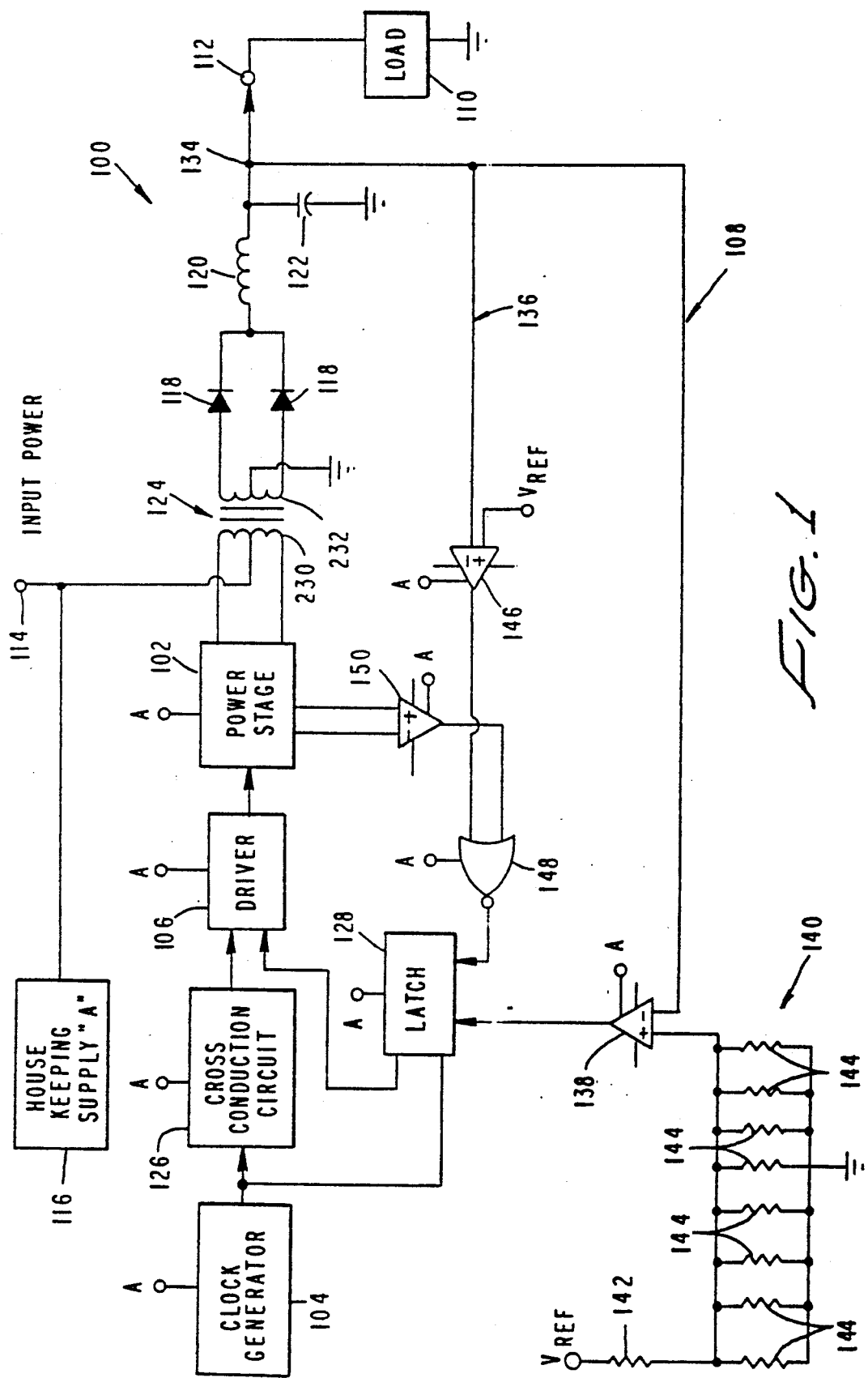
FIG. 1 is a simplified block diagram of an illustrative embodiment of the digital controlled converter of the present invention showing an analog control loop.

The invention is embodied in a digital controlled converter 100 of the type having a power stage 102 controlled by a high frequency clock generator 104 and a driver circuit 106 functioning as a switch, and a control loop 108 for providing fast transient response to changes in the output voltage signal caused by variations in a load 110 as shown in FIG. 1.

Generally, the power stage 102, the driver circuit 106 and the control loop 108 cooperate to substantially increase the speed of conversion of an input signal to a direct current (d.c.) output signal and to cause the switching of the power stage 102 and the transient response to wide and rapid load variations to be at the clock rate of the clock generator 102. Moreover, the converter 100 of the present invention is absolutely stable down to zero load on the output terminal 112, the size and weight of the converter packaging has been reduced, digital cross-conduction prevents simultaneous switching of multiple output stages, large power blocks can be incrementally controlled, input/output terminal isolation is simplified, and the use of integrated magnetics is facilitated by high speed operation. Additionally, the voltage output is programmable and multiphase operation simplifies electromagnetic interference filtering.

The digital controlled converter 100 is disclosed in FIG. 1 and includes a source of input power 114 having parameters of, for example, 120 volt, single phase, 60 Hz. Connected to the source of input power 114 is a logic circuit power supply normally referred to as the housekeeping supply 116. The housekeeping supply 116 manipulates the input power 114 to provide a low level d.c. output signal of approximately (½-1) watt. The housekeeping supply 116 develops a five volt d.c. signal to operate the digital logic incorporated within the converter 100. After the converter logic is operating, the housekeeping supply 116 is deenergized. The low level d.c. signal provided by the supply 116 is transmitted to the active elements of the converter 100 except a pair of diodes 118, a filter inductor 120 and a filter capacitor 122 located on the secondary side of a transformer magnetic 124. The low level d.c. signal is identified by the symbol "A" as shown in FIG. 1.

The function of the clock generator 104 is to provide a high frequency clock timing signal to control the switching rate of the digital controlled converter 100. The timing of each of the remaining elements of the converter 100 is synchronized to the clock timing signal. An optimum clock speed based upon factors such as efficiency and thermal considerations is selected to maximize power density and to minimize size and weight of the converter 100. However, as clock rates increase, the losses in the switching elements and the magnetics also increase. A suitable clock rate for the clock timing signal can be, for example, 500 KHz.

The 500 KHz clock timing signal is directed to a cross-conduction circuit 126 and a latch 128. The function of the cross-conduction circuit 126 is to prevent both of the push-pull stages of the power stage 102 from switching simultaneously. The cross-conduction circuit 126 can be an analog circuit or a digital circuit comprised of components known to those skilled in the art. The output terminal of the cross-conduction circuit 126 exhibits a high impedance. The input terminal to the power stage 102 requires a low impedance to properly operate the logic. Therefore, the driver circuit 106 is employed as a low impedance buffer to convert the high impedance output of the cross-conduction circuit 126 to a low impedance output for interfacing with the input of the power stage 102. The driver circuit 106 can be, for example, a unitrode field effect transistor (FET) driver. Further, the driver circuit 106 in cooperation with the latch 128 also functions as a switch to control the power stage 102 as described hereinbelow.

The output signal from the driver circuit 106 is delivered to the power stage 102. The power stage 102 can include a pair of push-pull stages incorporating switching FET's (not shown) to shape the waveform to provide the desired output signal. The power stage 102 functions as a power control valve and is the only power element included within the converter 100. It is noted that the performance of the switching FET's diminishes as the clock rate increases. This is because a significant amount of energy is required to drive the relatively large gate capacitors (not shown). Further, the combination of switching times coupled with delay times will ultimately account for the preponderance of the power loss.

The output signal of the power stage 102 is an alternating current (a.c.) signal which is delivered to the transformer magnetic 124. The transformer magnetic 124 is an a.c. coupling device and serves to isolate the a.c. output signal of the power stage 102 from the output terminal 112. Thus, the transformer magnetic 124 is selected to operate at the same frequency as the clock timing signal. An additional function of the transformer magnetic 124 is to serve as a "step-up/step-down" transformer. The primary winding 130 of the magnetic 124 is center tapped and connected to the source of input power 114 as shown in FIG. 1. This connection translates the low impedance of the input power 114 to the output terminal 112.

The secondary winding 132 of the magnetic 124 is connected to the pair of diodes 118 which form a full-wave rectifier bridge at the output of the converter 100. The function of the diodes 118 (e.g., the full-wave rectifier bridge) in combination with the inductor 120 and the capacitor 122 is to convert the a.c. signal coupled across the magnetic 124 to a d.c. signal, and to filter the resulting d.c. signal. The inductor 120 eliminates high current surges when the converter 100 is energized. The secondary winding 132 is also center tapped. The center tap of the secondary winding 132 and the capacitor 122 are each connected to electrical ground for completing a circuit as shown in FIG. 1. Further, the load 110 is shown connected between the output terminal 112 and ground.

Located between the capacitor 122 and output terminal 112 is a loop sense point 134. The loop sense point 134 is the starting point for two separate feedback paths. The first feedback path is the control loop 108 and the second feedback path is a protection loop 136. The control loop 108 comprises the loop sense point 134 connected to a comparator 138, a resistor ladder 140, the latch 128 and the driver circuit 106 as shown in FIG. 1.

The comparator 138 compares the output signal of the converter 100 at the loop sense point 134 with a reference voltage signal (Vref). The reference voltage signal (Vref) is provided by the resistor ladder 140 which includes an input resistor 142 and a plurality of ladder resistors 144. The output signal of the comparator 138 (e.g., either a logical "0" of "1") is determined by the load 110 connected to the output terminal 112. If additional power is needed at the output terminal 112, the output of the comparator 138 provides the appropriate logical value. Further, if additional power is not needed at the output terminal 112, the comparator 138 issues logical value consistent with that demand. The output signal of the comparator 138 is then transmitted to the latch 128.

The latch 128 receives and utilizes the output signal from the comparator 138 to control the driver circuit 106. In effect, the latch 128 serves as a digital control valve in the following way. The 500 KHz clock timing signal received at the latch 128 from the clock generator 104 forces the logic in the latch 128 to be interrogated at the clock rate. The latch 128 is a memory device that stores the signal from the comparator 138 for the duration of the clock timing signal.

The interrogation of the latch 128 by the 500 KHz clock timing signal resets the latch 128 to zero. Immediately after being reset to zero, the latch 128 receives an updated logic signal from the comparator 138. The updated signal is a first logical signal if more power is required at the output terminal 112. Under these conditions, an appropriate signal is transmitted to the driver circuit 106 to cause the driver circuit 106 to be "switched on". This action ensures that the power stage 102 will deliver power to the magnetic 124.

However, if the demand for power at the output terminal 112 has decreased, the updated signal from the comparator 138 is a second logical signal. Under this condition, an appropriate signal is transmitted to the driver circuit 106 to cause the driver circuit 106 to be "switched off". This action ensures that the power stage 102 will not deliver power to the magnetic 124. The updated signal from the comparator 138 is a transient value and varies with the load 110.

The memory of the latch 128 is interrogated and updated at the clock rate to force obsolete information out of the latch. The comparator 138 generates an output signal based upon a one millivolt error limitation. Thus, if the d.c. output voltage of the converter 100 is within one millivolt of the voltage reference (Vref), then an output signal exists at the comparator 138. The resetting and updating of the latch 128 in this manner provides incremental or pulse-to-pulse correction.

The process described above controls how the instantaneous output voltage is delivered to the driver circuit 106. The converter 100 of the present invention substantially improves the transient response to widely and rapidly changing conditions of the load 110 at the output terminal 112 because of the incremental correction provided by the control loop 108. Further, improved transient response exists even when the load 110 is non-linear and occurs at the rate of the clock timing signal. At a clock rate of 500 KHz, a correction signal in response to load variations is present at the input to the driver circuit 106 in approximately five clock pulses (e.g., ten microseconds). The present invention regulates the d.c. output voltage while ignoring the input voltage to the converter 100.

The protection loop 136 is provided to monitor the voltage and current conditions of the converter 100. An overvoltage comparator 146 having two inputs is shown in FIG. 1. One of the inputs to the overvoltage comparator 146 is the d.c. output voltage tapped from the loop sense point 134. The second input is connected to a reference voltage which controls the output signal from the overvoltage comparator 146. If the d.c output voltage from the converter 100 exceeds the voltage reference (e.g., for example, 15 volts d.c.), then the output of the overvoltage comparator 146 transits from a logical "0" to a logical "1". The logical "1" passes directly through an OR-gate 148 to the latch 128. The receipt of the logical "1" at the latch 128 causes the driver circuit 106 to transit to the "off" condition. This action deenergizes the power stage 102.

An overcurrent comparator 150 having two inputs is also shown in FIG. 1. Both of the inputs to the overcurrent comparator 150 are provided from the push-pull power stage 102. Thus, current is monitored from both sections of the power stage 102. A maximum current for the power stage 102 is selected. If exceeded, the comparator 150 senses the overcurrent condition. Thereafter, a logical "1" is generated by the overcurrent comparator 150 which passes through the OR-gate 148 to the latch 128. The receipt of the logical "1" at the latch 128 causes the driver circuit 106 to transit to the "off" condition. This action all deenergizes the power stage 102.

The interrogation and resetting to zero of the latch 128 at the clock rate and the immediate updating of the latch 128 also applies to the overvoltage and overcurrent comparators 146 and 150, respectively. Therefore, in addition to the comparator 138 updating the latch 128, the overvoltage comparator 146 and the overcurrent comparator 150 also update the latch 128 after each resetting procedure. Thus, the latch 128 always contains current information regarding the status of the converter 100 for controlling the power stage 102. It is noted that the choice of control logic is not severely limited with increasing clock rate. CMOS logic has proven to be adequate for clock rates up to approximately 1 MHz.

The circuit of the converter 100 accepts a 25 volt (a.c. or d.c.) signal from the source of input power 114 and generates a 15 volt d.c., 100 watt signal at the output terminal 112. The load 110 is the only dynamic variable that is tracked by the converter 100. In reducing the present invention to practice, a unitrode FET driver, a plurality of switching FET's and an LM139 Quad comparator were, for example, utilized for the driver circuit 106, the power stage 102 and the comparator 138, respectively. The balance of the converter 100 was realized with a standard CMOS family of devices, including the 500 KHz clock generator 104. The CMOS clock generator 104 is actually operating at 5 MHz and is divided down by a Johnson counter (not shown) to provide the logic control necessary to generate FET driver guard bands.

Figure 2:
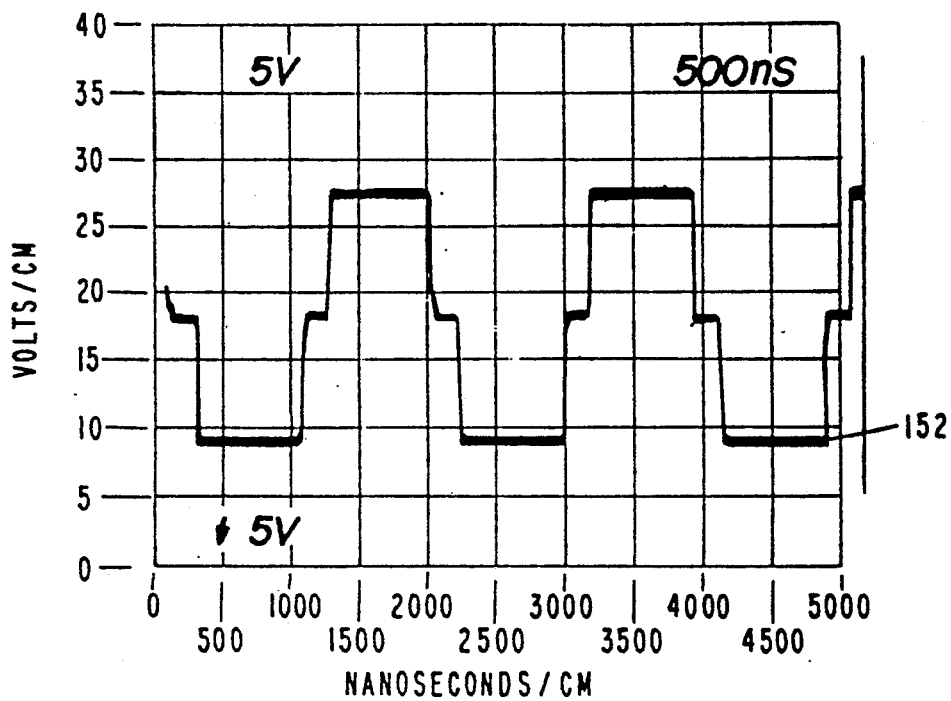
FIG. 2 is a waveform diagram of the output voltage of a cross-conduction circuit or the input voltage of a driver circuit of FIG. 1 showing the guard band technique.

The FET driver waveforms associated with the output signal of the cross-conduction circuit 126 and the driver circuit 106 are shown in FIG. 2. The waveforms are identified in FIG. 2 by the numeral 152 in which the vertical scale represents 5 volts/cm and the horizontal scale represents 500 nanoseconds/cm. A UC1710 FET driver selected for the driver circuit 106 affords a lower parts count commensurate with the required high performance.

To better illustrate the guardband technique, both FET drivers were added algebraically as shown in FIG. 2. Consequently, it can be seen that it is impossible for both sides of the push-pull output power stage 102 to receive simultaneous drive. Thus, one power section is energized while the other is deenergized. A dead time must exist between the power stages 102 to prevent high power current (e.g., shoot thru current) to flow. The programmed dead time detracts from the overall dynamic range but is acceptable considering the freedom from component variations. The digital cross-conduction circuit 126 reduces the load on the converter 100 and also simplifies electromagnetic interference (EMI) filtering. EMI filtering is simplified since it is easier to filter high frequency interference where the inductor 120 and capacitor 122 shown in FIG. 1 can be made smaller.

Figure 3:
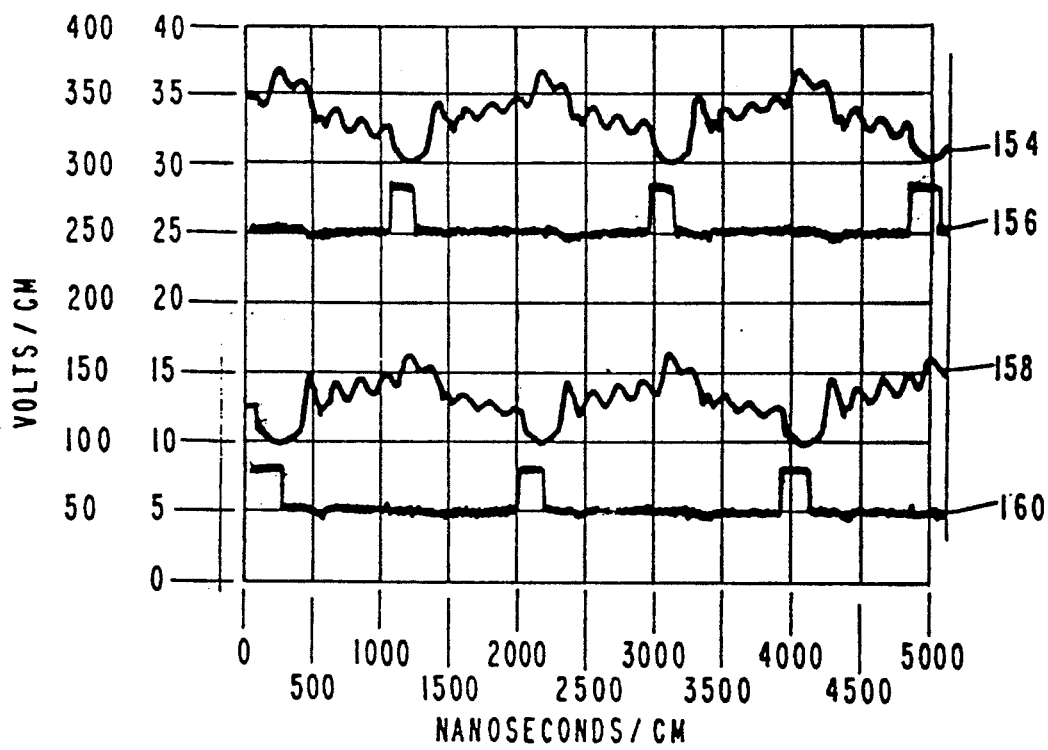
FIG. 3 is a plurality of waveform diagrams of the power output stage shown in FIG. 1 including transistor drain voltage and gate drive voltage.
Figure 4:
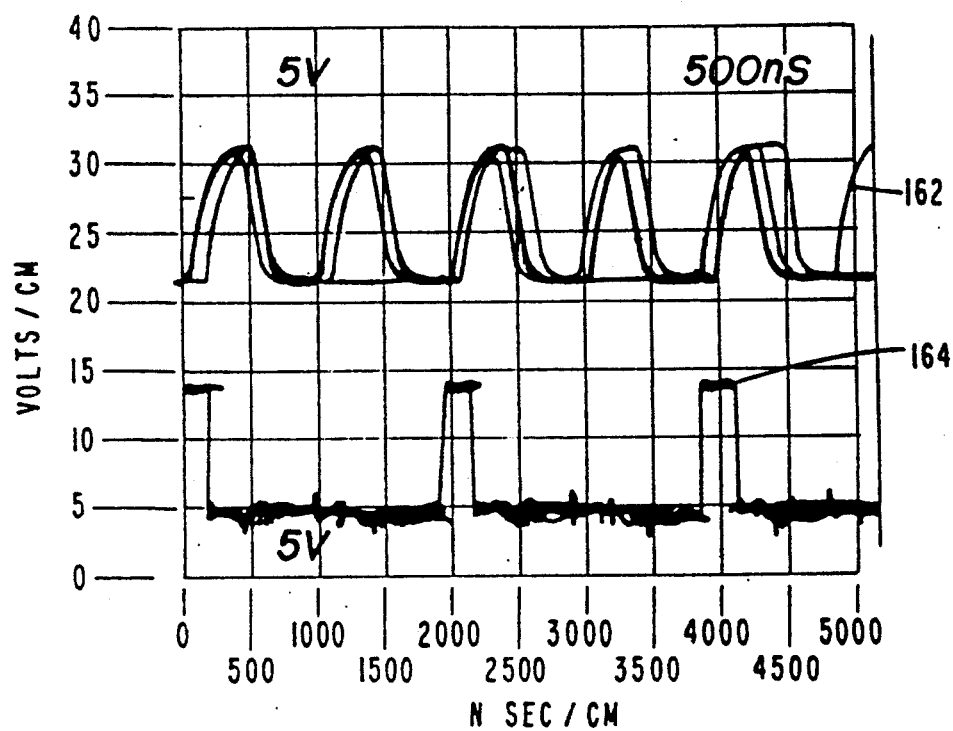
FIG. 4 is a plurality of waveform diagrams comparing the comparator and the power output stage shown in FIG. 1 including comparator voltage and transistor gate voltage.

The waveforms associated with the power stage 102 and the comparator 138, respectively, are shown in FIGS. 3 and 4. The waveforms associated with the power stage 102 shown in FIG. 3 include FET drain #1 voltage trace 154, gate drive trace 156 associated with FET #1, FET drain #2 voltage trace 158 and the gate drive trace 160 associated with FET #2. It is noted that in FIG. 3, the vertical scale represents 50 volts/cm for FET drain traces 154 and 158 and 5 volts/cm for the gate drive traces 156 and 160, respectively. The horizontal scale represents 500 nanoseconds/cm.

The ringing on the waveforms in FIG. 3 is caused by incomplete damping of the output magnetic 124 at this particular power lever. In this illustration, the load 110 was carefully adjusted until the various waveforms were stable. Since the power stage 102 is a push-pull output, the FET's are subjected to twice the supply voltage of 25 volts. These waveforms were obtained at a relatively light load 110 as is evident by the narrow gate pulse widths of approximately 50 watts.

The waveforms associated with the comparator 138 (and the voltage regulation path) shown in FIG. 4 include a control loop path trace 162 and a FET gate trace 164. In FIG. 4, the vertical scale represents 5 volts/cm and the horizontal scale represents 500 nanoseconds/cm. FIG. 4 is a comparison of typical waveforms obtained when a circuit board (not shown) of the converter 100 is delivering two amps to a fixed resistive load 110 from the 15 volt d.c. output terminal 112. There is evidence of voltage regulation as shown by the pulse width modulation of trace 164. Trace 164 shows how the gate drive (width) is being controlled. It is noted that FIG. 4 depicts only one-half of the push-pull output section of the power stage 102. If a third channel was monitored on the same waveform photograph, the other half of the push-pull output section would be visible every one microsecond thereby filling in the missing pulses.

Figure 5:
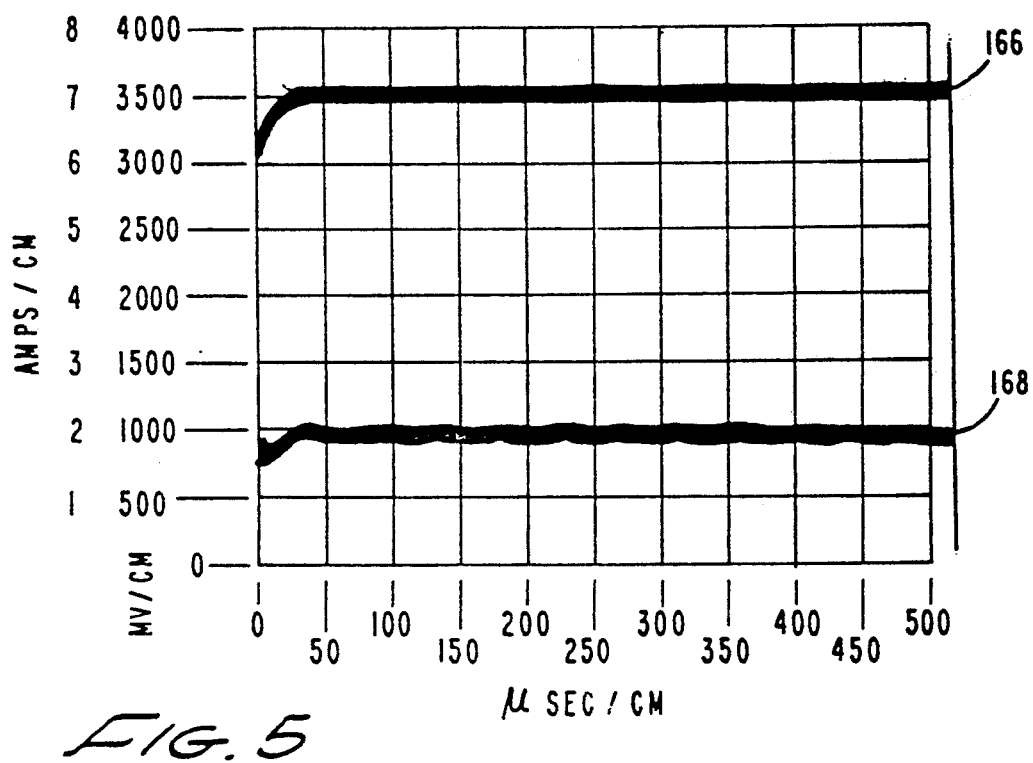
FIG. 5 is a pair of waveform diagrams of the control loop of FIG. 1 showing the leading edge of the current and voltage transient response.
Figure 6:
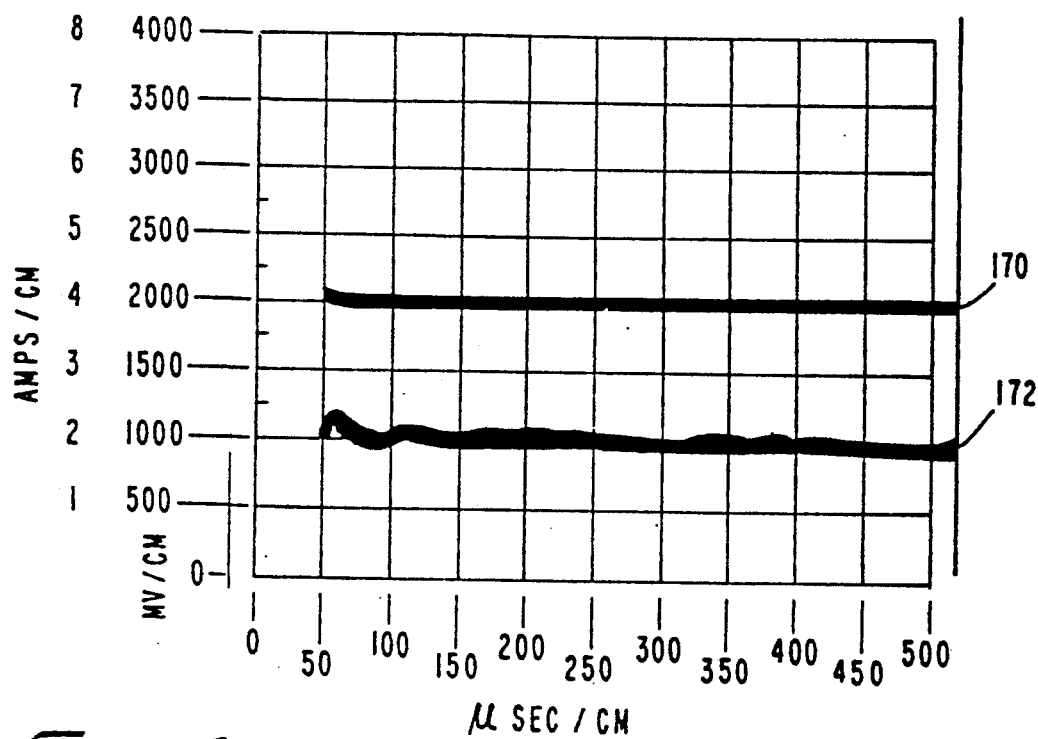
FIG. 6 is a pair of waveform diagrams of the control loop of FIG. 1 showing the trailing edge of the current and voltage transient response.

FIGS. 5 and 6 illustrate the transient performance of the converter 100 when the d.c. output voltage signal is subjected to a three amp switched resistive load 110. The waveforms of FIG. 5 show the control loop response leading edge and include a current probe trace 166 and a 15 volt output trace 168. The waveforms of FIG. 6 show the control loop response trailing edge and include a current probe trace 170 and a 15 volt output trace 172. Trace 166 of FIG. 5 and trace 170 of FIG. 6 each include a first vertical scale which represents one amp/cm. Additionally, trace 168 of FIG. 5 and trace 172 of FIG. 6 each include a second vertical scale which represents 500 millivolts/cm. The horizontal scale for each trace of both FIGS. 5 and 6 represents 50 microseconds/cm.

Both FIGS. 5 and 6 illustrate recovery times measured in several clock cycles. Note that the transistor (not shown) used to switch the resistive load 110 exhibits response times on the order of twenty microseconds and that the converter 100 recovers within approximately (8–10) clock cycles. This response time is in accordance with predicted results since the ten microhenry inductor 120 shown in FIG. 1 is located between the power stage 102 and the loop sense point 134 to suppress switching noise. Without the inductor 120 positioned as shown, the control loop 108 attempted to regulate on the magnitude of the switching transients present on both output and common lines. It is noted that the center of each waveform illustration of FIGS. 5 and 6 is the reference starting point for the current traces 166 and 170. The lower traces 168 and 172 are a.c. coupled to enable a more sensitive measurement of the 15 volt d.c. output signal.

Figure 7:
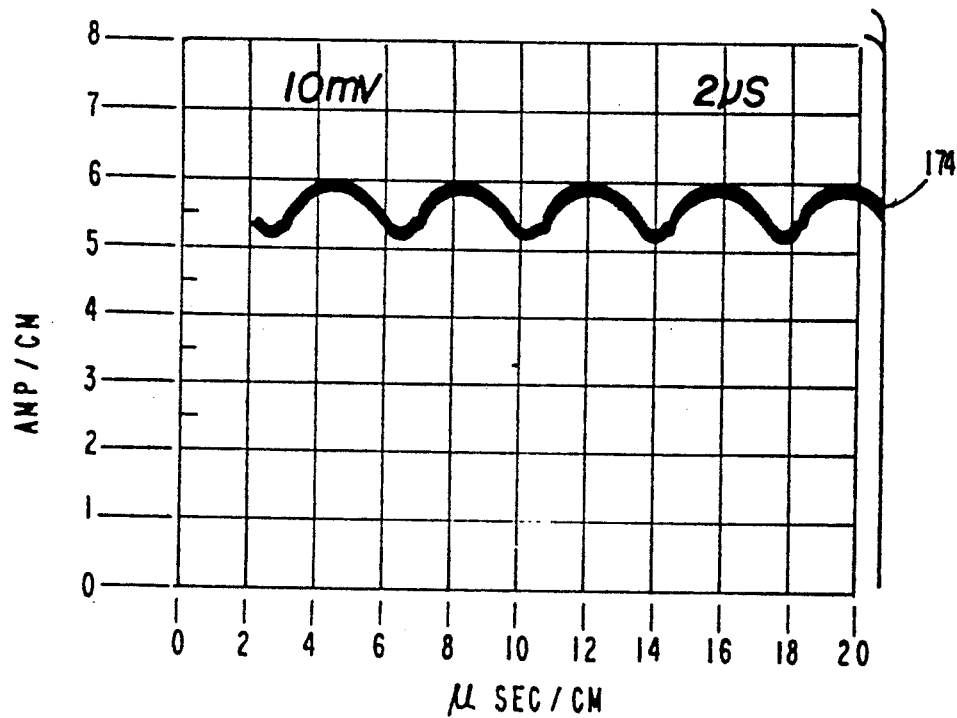
FIG. 7 is a waveform diagram of the input d.c. power line of FIG. 1 showing a 15 volt output driving a 2 amp static load.

The waveform associated with the source of input power 114 shown in FIG. 7 includes the input d.c. power line trace 174. The vertical scale of FIG. 7 represents one amp/cm while the horizontal scale represents two microseconds/cm. The trace 174 illustrates the reflected current waveform on the d.c. input power line of source 114 when the 15 volt d.c. output signal of converter 100 is driving a two amp static load 110 (e.g., 30 watts). The reason that the input current is lower than the output current is attributed to the turns ratio of the output magnetic 124 as well as the difference in voltages. The input voltage was 35 volts d.c. for this measurement. Note the relatively clean waveform and the absence of low frequency ripple on trace 174 of FIG. 7. This is the case in spite of the absence of an input filter. However, the one microfarad disk ceramic capacitor 122 is connected between the centertap of the secondary winding 132 of the magnetic 124 and common at the output stage.

Figure 8:
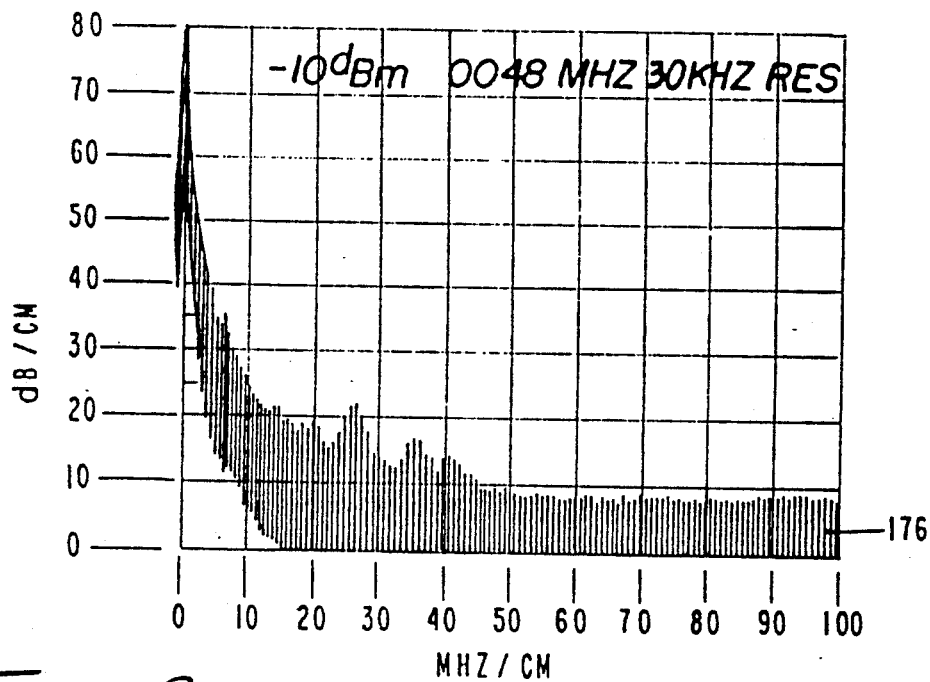
FIG. 8 is a waveform diagram showing the electromagnetic spectrum obtained from the input terminal to the digital controlled converter of FIG. 1.
Figure 9:
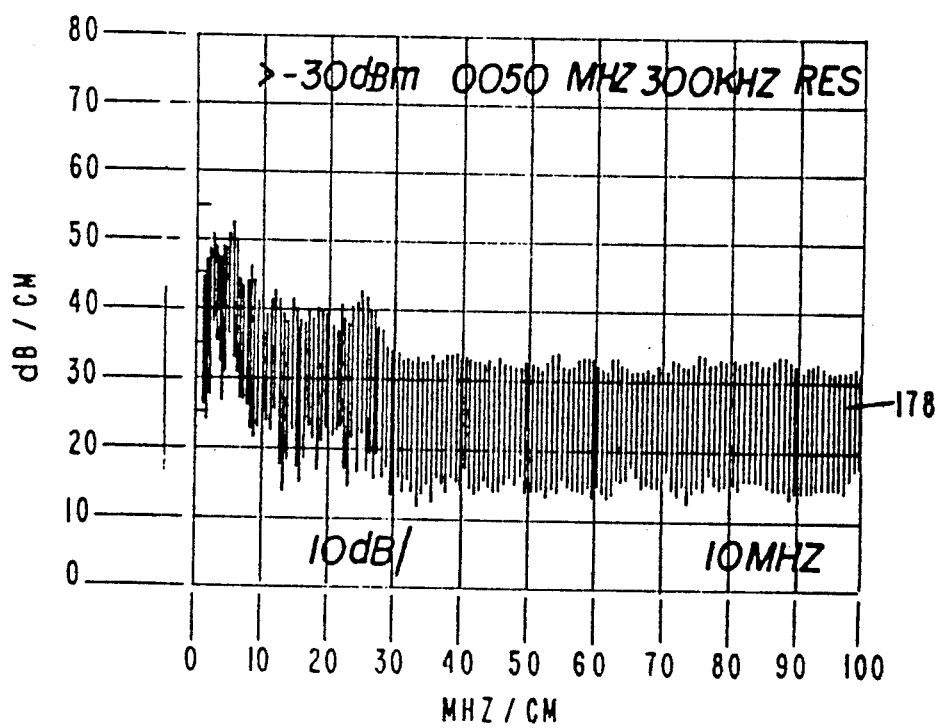
FIG. 9 is a waveform diagram showing the electromagnetic spectrum obtained from the output terminal to the digital controlled converter of FIG. 1.

FIGS. 8 and 9 illustrate the electromagnetic spectrum obtained from the input and output lines of the converter 100, respectively. The spectrum shown in FIG. 8 illustrates an input d.c. power line trace 176 for a 1.2 amp reflected load 110. The vertical scale of FIG. 8 represents attenuation at 10 dB/cm while the horizontal scale represents frequency at 10 MHz/cm at a bandwidth of 30 KHz. The spectrum shown in FIG. 9 illustrates an output d.c. power line trace 178 for a 2.0 amp reflected load 110. The vertical scale of FIG. 9 represents attenuation at 10 dB/cm while the horizontal scale represents frequency at 10 MHz/cm at a bandwidth of 300 KHz.

The spectrum analyzer employed to investigate the electromagnetic spectrum of FIGS. 8 and 9 was a Tektronix Spectum Analyzer model 7L13. The spectrum is relatively free of anomalies except for around 25 MHz as shown. This was caused by the reverse recovery characteristics of the output rectifier diodes 118. The addition of snubbers to the diodes 118 eliminates the problem. These measurements were obtained from an unshielded circuit board model absent any filtering except the inductor 120 shown in FIG. 1. Fine analysis of the converter 100 revealed the existence of the expected spectral lines emanating from the 5 MHz clock generator 104. The spectral lines were visible in the radiated spectrum but not in the conducted spectrum. Hot spots existed in the vicinity of the output rectifier diodes 118 and the power FET's (not shown) of the power stage 102.

Other aspects of the present invention are not readily apparent from the simplified block diagram of FIG. 1. One of these aspects is the requirement of two levels of current protection by the overcurrent comparator 150. These include fast response peak current protection to protect the internal electronics of the converter 100 and slow response for overload current protection under quasi-normal conditions. The slow response overload current protection also exhibits the current fold-back feature. Short circuit protection causes a recycle delay of ten clock cycles for thermal control.

Overvoltage protection is also provided by the overvoltage comparator 146 shown in FIG. 1. The logic of the driver circuit 106 is stored in memory to remember the last state. The driver circuit 106 guarantees the next active state will revert to the opposite FET section (not shown) of the power stage 102. This solves the problem of potential unipolar operation and subsequent saturation of the core or the transformer magnetic 124. As a result, core size is also minimized.

Figure 10:
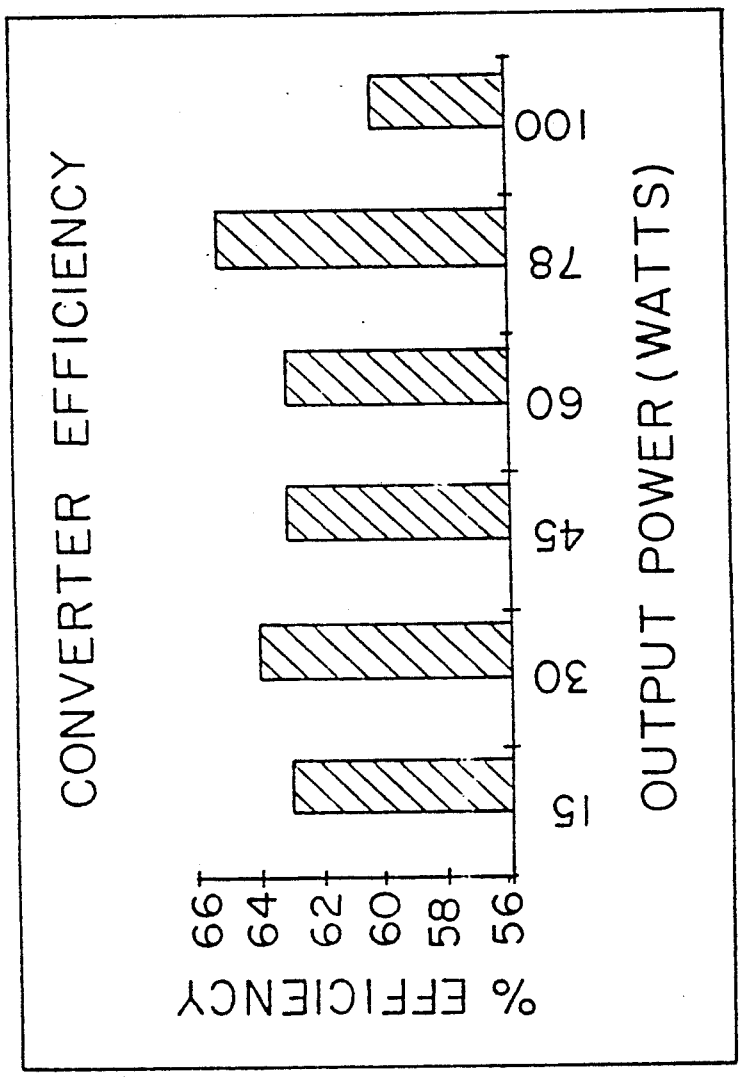
FIG. 10 is a graph showing efficiency of the digital controlled converter of FIG. 1 at different levels of output power.

The digital control loop 108 of the converter 100 lends itself to minimal package density. Efficiency of the converter 100 is disclosed in the graph of FIG. 10 which represents raw data. The horizontal scale represents the output power in watts while the vertical scale represents efficiency. The efficiency varied approximately between 63% and 66%. It was determined that the bulk of the power loss was associated with the power FET's of the power stage 102. The core losses of the magnetic 124 were approximately two watts.

The present invention provides many advantages. Major advantages include that the transient response is proportional to the clock rate of the clock generator 104, packaging is minimized and the converter is unconditional stable to zero load. As the clock rate increases, the control loop 108 is capable of responding more rapidly to load variations at the output terminal 112. Further, the speed of operation is limited only by the practical switching capabilities of logic components. Various types of dynamic loads including large inductive capacitive and resonant configurations were investigated. Instability in the operation of the converter 100 did not exist.

It was further determined that the output voltage could easily be made programmable, that multi-frequency operation, if utilized, raises equivalent ripple frequency, that paralleling of multiple output sections will not cause instability, that large blocks of power can be controlled incrementally, that input/output isolation is simplified since the control signal is digital, and that high speed operation facilitates the use of integrated or flat magnetics.

Figure 11:
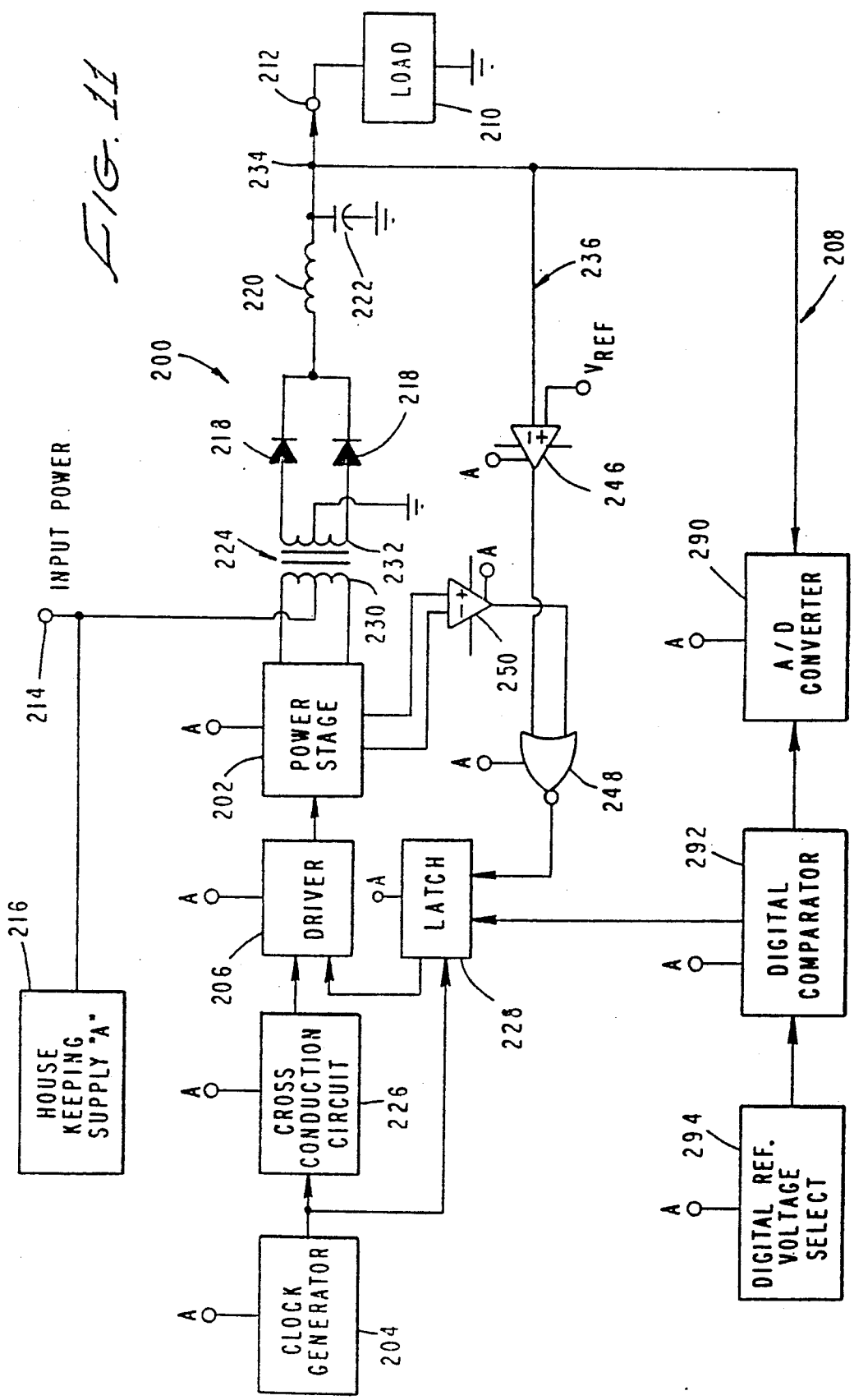
FIG. 11 is a simplified block diagram of an alternative embodiment of the digital controlled converter of the present invention showing a digital control loop.

A simplified block diagram of an alternative embodiment of the digital controlled converter of the present invention is shown in FIG. 11. In this instance, the alternative embodiment of the converter in FIG. 11 is very similar to the converter 100 of FIGS. 1-10. Elements of the converter of FIG. 11 which find substantial correspondence in structure and function to those elements of FIGS. 1-10 are designated with corresponding designations of the two-hundred series.

The converter 200 shown in FIG. 11 operates in a duplicate manner as the converter 100 shown in FIG. 1 except as explained hereinbelow. Converter 200 differs from converter 100 in the design of the control loop 208. In converter 100 shown in FIG. 1, the analog value of the d.c. output voltage was fed directly to the comparator 138. However, comparator 200 exhibits a digital implementation of the control loop 208.

In the converter 200, the analog value of the d.c. output voltage is transmitted to an eight-bit analog-to-digital (A/D) converter 290. The A/D converter 290 converts the analog d.c. output signal to an eight-bit wide digital word. The eight-bit wide digital word equivalent of the d.c. output voltage is directed to a digital comparator 292 shown in FIG. 11. A digital reference voltage select 294 is a logic element that is equivalent to the resistor ladder 140 of FIG. 1. The reference voltage select 294 can include resistors in a block and is readily programmable. As with the resistor ladder 140 of FIG. 1, the reference voltage select 294 is utilized to vary the reference voltage (Vref) to the digital comparator 292.

The digital reference voltage select 294 generates an eight-bit wide digital word reference comprised of logical characters (e.g., "1" and "0"). The eight-bit wide digital word reference is then transmitted to the digital comparator 292. The digital comparator 292 then compares the eight-bit wide digital word reference to the eight-bit wide digital word equivalent of the d.c. output voltage in a manner very similar to that of converter 100. The output of the digital comparator 292 is a logical character consistent with the current demand for power at the output terminal 212 shown in FIG. 11.

The output logical character from the digital comparator 292 is then transmitted to the latch 228 for controlling the switching of the driver circuit 206 and the power stage 202 in a manner duplicate to that described for converter 100 in FIG. 1. The operation of the remainder of the converter 200 is the same as that described for the converter 100. A specific application of the converter 200 incorporating the digital implementation of the control loop 208 is where remote control via, for example, satellite link would be of particular advantage.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed.

On the contrary, the invention is to cover all modifications and alternate constructions coming within the spirit and scope of the invention as generally expressed by the following claims, which particularly point out and distinctly claim the subject matter of the invention:

1. A digital controlled converter comprising:
   means for generating a high frequency clock timing signal;
   switching means for controlling the passage of said high frequency clock timing signal within said converter;
   power means for providing an output signal, said power means controlled by said switching means;
   control loop means for sensing and converting said output signal to a command signal; and
   means for latching said command signal and for controlling the state of said switching means, said latching and controlling means being reset at the rate of said high frequency clock timing signal and updated with said command signal to provide incremental correction to said output signal wherein said converter comprises a transient response to variations in load proportional to said high frequency clock timing signal.

2. The digital controlled converter of claim 1 wherein said generating means includes a clock pulse generator.

3. The digital controlled converter of claim 1 wherein said switching means includes an electronic driver circuit.

4. The digital controlled converter of claim 1 wherein said power means includes an electronic power output stage.

5. The digital controlled converter of claim 1 wherein said control loop means includes a loop sense point and a comparator to sense and convert said output signal to said command signal.

6. The digital controlled converter of claim 1 wherein said control loop means includes a resistor ladder for providing a reference voltage.

7. The digital controlled converter of claim 1 wherein said control loop means includes a voltage select device for providing a digital word reference.

8. The digital controlled converter of claim 1 wherein said control loop means includes an analog-to-digital converter for converting said output signal to an equivalent digital signal.

9. The digital controlled converter of claim 1 wherein said latching and controlling means comprises a latch.

10. The digital controlled converter of claim 1 further including a cross-conduction circuit to prevent simultaneous operation of multiple stages in said power means.

11. The digital controlled converter of claim 1 further including a transformer magnetic for isolating said power means from an output terminal.

12. The digital controlled converter of claim 1 further including a rectifier circuit for converting said output signal to a direct current signal.

13. The digital controlled converter of claim 1 further including an over-voltage circuit for sensing and terminating an over-voltage condition.

14. The digital controlled converter of claim 1 further including an over-current circuit for sensing and terminating an over-current condition.

15. A digital controlled converter comprising:
    a clock generator for generating a high frequency clock timing signal;
    a driver circuit for controlling the passage of said high frequency clock timing signal within said converter;
    a power output stage for providing an output signal, said power output stage controlled by said driver circuit;
    control loop means for sensing and converting said output signal to a command signal; and
    a latch for latching said command signal and for controlling the state of said driver circuit, said latch being reset at the rate of said high frequency clock timing signal and updated with said command signal to provide incremental correction to said output signal wherein said converter comprises a transient response to variations in load proportional to said high frequency clock timing signal.

16. A method for providing digital controlled conversion of an input signal to a direct current signal, said method comprising the steps of:
    generating a high frequency clock timing signal;
    controlling the passage of said high frequency clock timing signal with a driver circuit;
    providing an output signal from an output stage controlled by said driver circuit;
    sensing and converting said output signal to a command signal;
    latching said command signal and controlling the state of said driver circuit with a latch;
    resetting said latch at the rate of said high frequency clock timing signal;
    updating said latch with said command signal to provide incremental correction to said output signal; and
    providing a transient response to variations in load proportional to said high frequency clock timing signal.

17. The method of claim 16 further including the step of isolating said output stage from an output terminal with a transformer magnetic.

18. The method of claim 16 further including the step of converting said output signal to a direct current signal in a rectifier circuit.

19. The method of claim 16 further including the step of sensing and terminating an over-voltage condition with an over-voltage circuit.

20. The method of claim 16 further including the step of sensing and terminating an over-current condition with an over-current circuit.

* * * * *